March 11, 1969 H. HARVEY ET AL 3,432,841
STATUS INDICATING AND ALARM ANNUNCIATING SYSTEMS
FOR ELECTRICALLY POWERED DEVICES
Filed Dec. 13, 1967 Sheet 1 of 9

INVENTORS
Herbert Harvey
Martin H. Sims &
Charles L. Clay
Birch and Birch
ATTORNEYS INVENTORS
Herbert Harvey
Martin H. Sims &
Charles L. Clay
BY
Birch and Birch
ATTORNEYS INVENTORS
Herbert Harvey
Martin H. Sims &
Charles L. Clay
BY
Birch and Birch
ATTORNEYS INVENTORS
Herbert Harvey
Martin H. Sims &
Charles L. Clay
BY Birch and Birch
ATTORNEYS

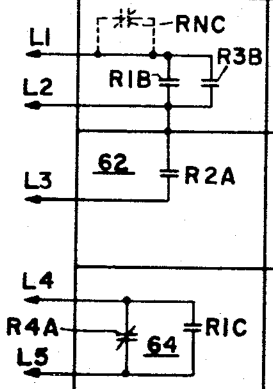

| CONTACTS | (SEE FIG. 2.) COMPUTER SEES | BASIC INFORMATION TO COMPUTER: CIRCUIT OPEN | BASIC INFORMATION TO COMPUTER: CIRCUIT CLOSED | DECISIONS MADE BY COMPUTER WHEN COMPARING BASIC BITS OF INFORMATION AND INSTRUCTIONS GIVEN TO TYPEWRITER BY COMPUTER TELLING IT WHAT TO TYPE — CASE NO. 1: BITS COMPARED | CASE NO. 1: DECISION MADE | CASE NO. 1: INSTRUCTIONS TO TYPEWRITER |
|---|---|---|---|---|---|---|
| | CIRCUIT BETWEEN L1 & L2 | MOTOR NOT READY TO RUN | MOTOR READY TO RUN | CIRCUIT OPEN | MOTOR NOT ASKED TO RUN MOTOR NOT READY TO RUN AND NOT IN ALARM CONDITION MEANS MOTOR NOT READY TO RUN | TYPE<br>MOTOR IDENTIFICATION<br>"NOT READY TO RUN"<br>DATE AND TIME OF DAY |
| | CIRCUIT BETWEEN L2 & L3 | MOTOR NOT ASKED TO RUN | MOTOR ASKED TO RUN | CIRCUIT OPEN | | |
| | CIRCUIT BETWEEN L4 & L5 | ALARM | NO ALARM | CIRCUIT CLOSED | | |
| 1 | 2 | 3 | 4 | 5 | 6 | 7 |

LEGEND

| | |
|---|---|
| FIG. 3a. | FIG. 3b. |
| FIG. 3c. | FIG. 3d. |

FIG. 3a.

INVENTORS
Herbert Harvey
Martin H. Sims &
Charles L. Clay
BY Birch and Birch
ATTORNEY

| CASE NO. 2 | | | CASE NO. 3 | | |
|---|---|---|---|---|---|
| BITS COMPARED | DECISION MADE | INSTRUCTIONS TO TYPEWRITER | BITS COMPARED | DECISION MADE | INSTRUCTIONS TO TYPEWRITER |
| CIRCUIT CLOSED<br>CIRCUIT OPEN<br>CIRCUIT CLOSED | MOTOR NOT ASKED TO RUN MOTOR READY TO RUN AND MOTOR NOT IN ALARM CONDITION MEANS MOTOR READY TO RUN | TYPE MOTOR IDENTIFICATION "READY TO RUN" DATE AND TIME OF DAY | CIRCUIT CLOSED<br>CIRCUIT CLOSED<br>CIRCUIT CLOSED | MOTOR ASKED TO RUN MOTOR READY TO RUN AND MOTOR NOT IN ALARM CONDITION MEANS MOTOR RUNNING | TYPE MOTOR IDENTIFICATION "RUNNING" DATE AND TIME OF DAY |
| 8 | 9 | 10 | 11 | 12 | 13 |

FIG. 3b.

INVENTORS
Herbert Harvey
Martin H. Sims &
Charles L. Clay
BY
Birch and Birch
ATTORNEYS

| CASE NO. 4 | | | CASE NO. 5 | | |
|---|---|---|---|---|---|
| BITS COMPARED | DECISION MADE | INSTRUCTIONS TO TYPEWRITER | BITS COMPARED | DECISION MADE | INSTRUCTIONS TO TYPEWRITER |
| CIRCUIT CLOSED | MOTOR ASKED TO RUN MOTOR READY TO RUN AND MOTOR IN ALARM CONDITION MEANS MOTOR STOPPED BECAUSE OF OVERLOAD | TYPE MOTOR IDENTIFICATION "OVERLOADED" DATE AND TIME OF DAY | CIRCUIT OPEN | MOTOR NOT ASKED TO RUN MOTOR NOT READY TO RUN MOTOR IN ALARM CONDITION MEANS MOTOR STOPPED BECAUSE OF POWER FAILURE | TYPE MOTOR IDENTIFICATION "POWER FAILURE" DATE AND TIME OF DAY |
| CIRCUIT CLOSED | | | CIRCUIT OPEN | | |
| CIRCUIT OPEN | | | CIRCUIT OPEN | | |
| 14 | 15 | 16 | 17 | 18 | 19 |

FIG. 3c.

INVENTORS
Herbert Harvey
Martin H. Sims &
Charles L. Clay
BY Birch and Birch
ATTORNEYS

FIG. 3d.

| CASE NO. 6 | | |
|---|---|---|
| BITS COMPARED | DECISION MADE | INSTRUCTIONS TO TYPEWRITER |
| CIRCUIT OPEN<br>CIRCUIT CLOSED<br>CIRCUIT CLOSED | MOTOR ASKED TO RUN<br>MOTOR NOT READY TO RUN<br>MOTOR NOT IN ALARM CONDITION MEANS MOTOR RUNNING BUT DRIVEN EQUIPMENT HAS FAILED | TYPE<br>MOTOR IDENTIFICATION<br>"EQUIPMENT FAILURE"<br>DATE AND TIME OF DAY |
| 20 | 21 | 22 |

INVENTORS
Herbert Harvey
Martin H. Sims &
Charles L. Clay
BY
Birch and Birch
ATTORNEYS INVENTORS
Herbert Harvey
Martin H. Sims &
Charles L. Clay
BY
Birch and Birch
ATTORNEYS United States Patent Office 3,432,841
Patented Mar. 11, 1969

3,432,841
STATUS INDICATING AND ALARM ANNUNCIATING SYSTEMS FOR ELECTRICALLY POWERED DEVICES

Herbert Harvey, Palos Verdes Estates, Martin H. Sims, Redondo Beach, and Charles L. Clay, Long Beach, Calif., assignors to Harvey Aluminum Incorporated, Torrance, Calif., a corporation of California Filed Dec. 13, 1967, Ser. No. 690,291
U.S. Cl. 340—248 39 Claims
Int. Cl. G08b *21/00, 28/00*

ABSTRACT OF THE DISCLOSURE

A status and control system is provided for electrically powered devices such as electric motors including a sealed status module having a plurality of condition sensing relays therein adapted to be interconnected through distinct electrical interfaces with energizing or motor starter circuitry and information read out circuitry, respectively, the latter being connected to a computer or instrument input for the purpose of providing status information with regard to a plurality of predetermined conditions of a device or motor being monitored. In the case in which a computer is used, the computer can be programmed to type out the status information for each device or motor being monitored in response to the conditions of predetermined combinations of sensing relays in the sealed status module. Each such device or motor is monitored by an individual sealed status module in combination with its individual energizing or motor starter circuitry.

The present invention relates in general to a status system for the annunciation and alarm of electrically powered devices, and more particularly to the display and/or annunciation of the status and the alarm of abnormal conditions of electric motors.

In facilities employing a large number of electric motors the continuity of output of the facility depends upon how close to 100% the "availability" of all required motors can be maintained, availability in this sense meaning the percentage of the required running time the motors actually run.

Maintaining high availability of required motors requires immediate knowledge of abnormal motor stoppages and whether standby motors are available, as well as what associated motors are running. To be fully effective, such data must be available at a central location in an easily read form so that an operator can quickly correct the abnormality.

Another requirement for maintaining availability of required motors is substantially immediate access to accurate and complete data, indicating upon request which of the standby motors are ready to run and which are down for maintenance at the instant of request. Such data provides a central maintenance department with information as to where work is required as well as a continual log on the efficiency of the maintenance program.

This data is made available by use of this invention whether the motor starting is automatic or, from one or more momentary type ("start-stop" separately located) pushbutton stations or, from a maintained type contact "Start-Stop" switch station.

The data can be displayed in the form of lights, lighted windows or "drops" but it is of maximum use when it is presented in typed form.

It is, therefore, an object of this invention to provide a new and novel status indicating and alarm annunciating system for electrically powered devices which includes provisions to refine data for feed into a computer that can then provide the information, described above, in typed form, together with audible signals for alarm conditions.

It is another object of this invention to provide a new and novel status indicating and alarm annunciating system for electrically powered devices, wherein the type form of data eliminates the need for an operator to visually scan a large bank of lights or drops, minimizes errors caused by misreading the nameplates associated with the lights and provides a permanent record; and further, in special cases, and for small facilities, which can be readily adapted for use with readout devices comprising lights or drops.

Another object of this invention is to provide a new and novel status indicating and alarm annunciating system for electrically powered devices, including a new and novel interface between the power control circuitry and the status reporting and/or alarm annunciation circuitry that eliminates any requirement for routing the status reporting or alarm annunciation wiring in power control conduits, pushbutton stations, switches or any other enclosure containing power control wiring; whereby the invention obviates the hazards of mixing such circuits, also eliminates costs involved in such things as instrument wiring to remote pushbutton stations, and provides simple and expeditious means for the incorporation in the system of new electrically powered devices, such as motors and/or for plant expansions.

A further object of this invention is to provide a new and novel status indicating and alarm annunciating system for electrically powered devices including a hermetically sealed field unit that acquires and refines the data thus permitting trouble free operation in dusty, humid and otherwise deleterious environments.

A further object of this invention is to provide a new and novel status indicating and alarm annunciating system for electrically powered devices having a memory capability of status conditions which is not erased by any power failure, and as soon as power is restored the system automatically goes back into full operation; and which, during the time power is off in the plant, will still provide accurate read out of status and alarms by the simple expedient of applying standby power to the computer alone.

A further object of this invention is to provide a new and novel status indicating and alarm annunciating system for electrically powered devices which, in the case of monitored electric motors, when there is an abnormal motor stoppage, the central control operator is automatically informed as to whether stoppage was from overload on the motor or power failure to the motor; thereby permitting the operator to make an immediate decision as to whether he should start a standby motor or fix some trouble in the plant equipment.

A further object of this invention is to provide a new and novel status indicating and alarm annunciating system for electrically powered devices having the capability to incorporate additional data other than just that available from the motor, such as, for example, such motor-controlled parameters as flow, pressure, temperature, torque, motion, etc., by the simple expedient of additional sensing devices to detect whether or not this purpose is being achieved and the incorporation of a contact from such a sensing device in the status system, without the need for otherwise altering the system; thereby effecting additional distinct monitoring and annunciating functions when the motor is not achieving its purpose, even though it may be running.

Yet another object of this invention is to provide a new and novel status indicating and alarm annunciating system for electrically powered devices which will minimize the space required in a central control room, or the like, for the display of status and other annunciated data.

The embodiment of this invention disclosed hereinafter is oriented toward its application to monitoring the status of one, or a large plurality of, electric motors; however, it is applicable to other magnetic contactor or magnetic starter controlled electric powered devices as well as to any process or physical variable that can be sensed and transduced into electric contact openings and closures, i.e., two-state or bi-stable condition response functions.

These and other objects of this invention will become more readily and fully apparent with reference to the following specification and drawings which define a preferred embodiment of this invention.

In the drawings:

FIGURE 3 is a chart showing the form and interpretation of the input logic to a computer.

Figure 1A:
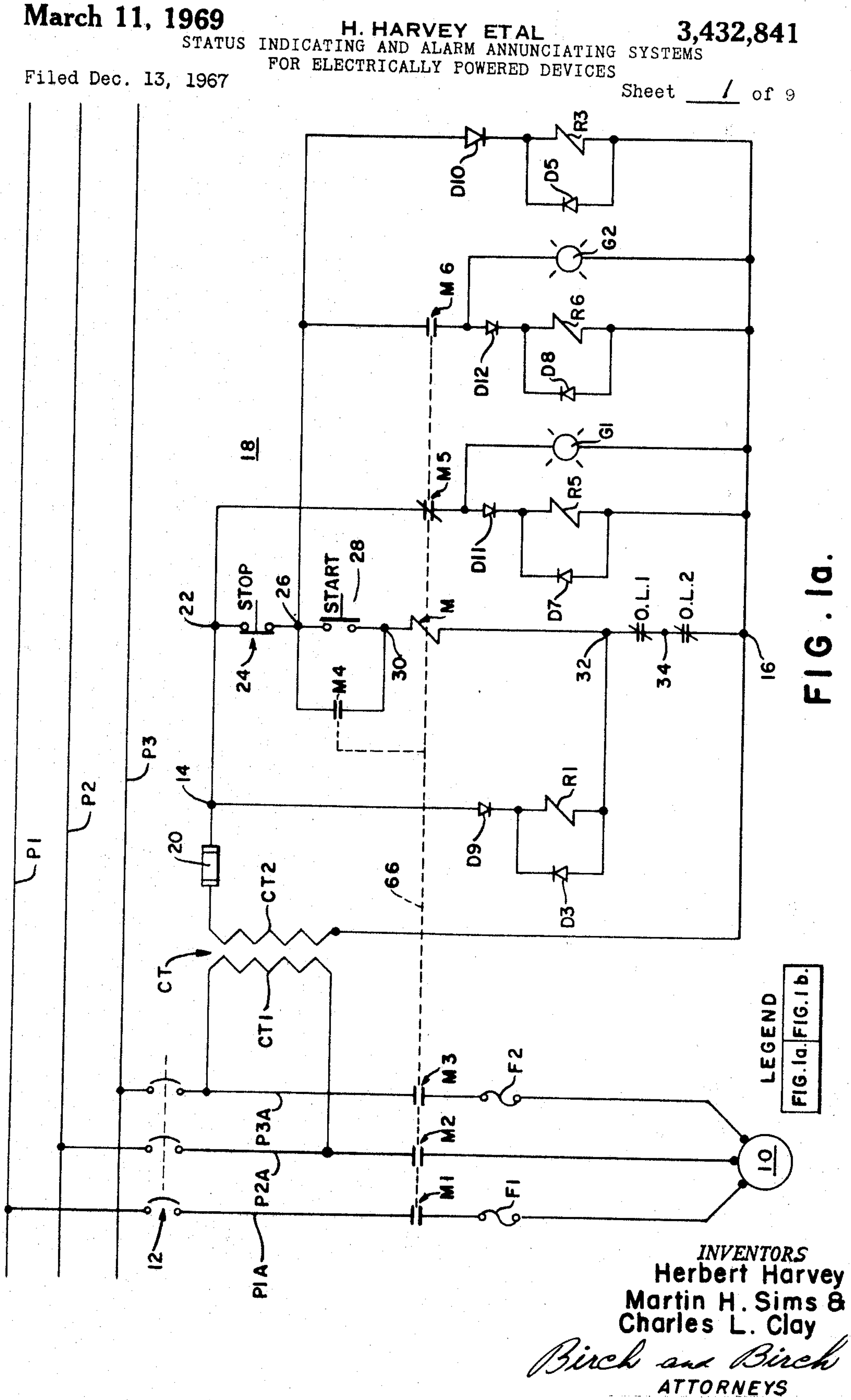
FIGURE 1 is a schematic circuit diagram arranged to more clearly depict the logic functions of the invention, showing a typical motor control circuit containing a motor, a motor starter with overloads and auxiliary contacts, a (branch circuit) circuit breaker, a control power transformer with fuse, indicating lights, "Status System" relays and diodes and D.C. power supply.

Referring in detail to the drawings, and more particularly to FIGURE 1, motor control, status and condition responsive circuitry for a single electric motor will now be described.

The embodiments shown are for a three-phase system including a three-phase power bus or motor control center bus comprised of power leads P1, P2 and P3.

A three-phase motor 10 is shown with a branch line circuit breaker 12 in the motor input leads P1A, P2A and P3A, corresponding, respectively, to the main power leads P1, P2 and P3.

The motor input leads P1A, P2A and P3A include, respectively, first, second and third motor starter contacts M1, M2 and M3 of the normally open type.

A single-phase control transformer CT has a primary CT1 connected across the second and third motor input leads P2A and P3A and a secondary CT2 connected across the input terminals 14 and 16 of a motor control and status indicator circuit 18. A line fuse 20 is placed in series between one end of the secondary CT2 and the first input terminal 14.

Fourth, fifth and sixth motor control contacts M4, M5 and M6 are included in the circuit 18 in respective parallel branches across the input terminals 14 and 16 of the said circuit 18.

A motor starter relay winding M is provided in the branch circuit of the fourth control contacts M4, this branch circuit comprising a first circuit node 22 directly connected with the first input terminal 14; a normally closed motor STOP switch 24 in series between the first node 22 and a first junction 26; a normally open motor START switch 28 in series between the first junction 26 and a second junction 30 and in parallel with the fourth control contacts M4, the latter being connected between the said first and second junctions 26 and 30; the control relay winding M in series between the second junction 30 and a third junction 32; and first and second normally closed overload contacts OL1 and OL2, having a fourth junction 34 therebetween, in series between the third junction 32 and the second input terminal 16 of the circuit 18.

A condition sensing companion circuit 36 is provided which is energized through a pair of leads P2B and P3B connected, through line fuses 38 and 40, respectively, and a single-throw double-pole disconnect switch 42, from the second and third power leads P2 and P3 of the main bus to the terminals of the primary RT1 of a rectifier transformer RT. The secondary RT2 of the rectifier transformer RT includes a center tap 44 connected with a third common power lead 46 and first and second output terminals 48 and 50 connected through first and second diodes D1 and D2, respectively, in a full-wave configuration, to a second circuit node 52, and thence through a choke coil or inductance L to a third circuit node 54, the said node 54 being on a fourth common power lead 56. A smoothing capacitor C is connected between the third circuit node 54 and the third common lead 46 for a purpose to be hereinafter more fully described. The combined control and companion circuits 18 and 36 include first, second, third, fourth, fifth and sixth sensing relays indicated, respectively, by a first winding R1, second pick-up and drop-out windings R2PU and R2DO, third winding R3, fourth pick-up and drop-out windings R4PU and R4DO, fifth winding R5 and sixth winding R6. Said windings are respectively by-passed by suppressor diodes D3, D4, D5, D6, D7 and D8, the diodes D4 and D6 being only across the second and fourth drop-out windings R2DO and R4DO, respectively; the second and fourth pick-up windings R2PU and R4PU not having suppressor diodes.

The first relay winding R1 has first, second and third associated contact pairs R1A, R1B and R1C, respectively, all of which are normally open.

The second relay windings R2PU and R2DO have one associated contact pair R2A which is normally open.

The third relay winding R3 has two associated contact pairs R3A and R3B which are normally closed and normally open, respectively.

The fourth relay windings R4PU and R4DO have one associated contact pair R4A which is normally closed.

The fifth relay winding R5 has one associated contact pair R5A which is normally open.

The sixth relay winding R6 has two associated contact pairs R6A and R6B which are normally open and normally closed, respectively.

Throughout the remainder of this application, the terms "contact(s)" and "contact pair(s)" will denote equivalent operative structures.

The first relay winding R1 is connected between the first input terminal 14 and the third junction 32 in the control circuit 18, in series with a ninth diode D9 having its anode connected at the said first input terminal 14 and its cathode at one side of the said first winding R1.

The second relay windings R2PU and R2DO are connected in respective parallel branch circuits between the third and fourth common leads 46 and 56 of the companion circuit 36; the first normally open contact pair R6A of the sixth winding R6 being in series between the pick-up winding R2PU of the second relay and the fourth common lead 56 and having a common fourth junction 58 with the said winding R2PU; and the second normally closed contact pair R6B of the sixth winding R6 and the first normally closed contact pair R3A of the third winding R3 having a common fifth junction 60 therebetween and being connected in series between the fourth common lead 56 and the said drop-out winding R2DO of the second relay, the said contact pair R6B being adjacent the said fourth common lead 56.

The third relay winding R3 is connected between the first junction 26 and second common lead 16 of the control circuit 18 in series with a tenth diode D10 having its anode at the first junction 22 and its cathode at one side of the said third winding R3.

The fourth relay pick-up winding R4PU is connected in parallel across the second relay pick-up winding R2PU between the fourth junction 58 and the third common lead 46; and the fourth relay drop-out winding R4DO is connected in series with the first contact pair R1A of the first relay and the contact pair R5A of the fifth relay from the fifth junction 60 across the first contact pair R3A of the third relay and the second relay drop-out winding R2DO to the third common lead 46.

The fifth relay winding R5 is connected in a branch circuit in the control circuit 18 comprising, from the first junction 22 on the input terminal 14, the normally closed fifth controller contact pair M5, anode-cathode path of an eleventh diode D11 and the said fifth winding R5, all in series, the latter having one end connected to the second common lead 16, and a first indicator lamp G1 in shunt with the eleventh diode D11 and the said fifth winding R5. The indicator lamp G1 may be green in color and indicates an "available" status of the motor 10, as will be hereinafter more fully described.

The sixth relay winding R6 is connected in a branch circuit in the control circuit 18 comprising, from the second junction 26, the sixth normally open controller contact pair M6, the anode-cathode path of a twelfth diode D12 and the sixth relay winding R6, all in series, the latter having one end connected to the second common lead 16, and a second indicator lamp G2 in shunt with the twelfth diode D12 and the said sixth relay winding R6. The second indicator lamp G2 may be red in color and indicates a "running" status of the motor 10, as will hereinafter be more fully described.

External to the control circuit 18 and companion circuit 36, but responsive to the first, second, third and fourth relay windings R1, R2, R3 and R4, are first and second contact networks 62 and 64, respectively.

The first contact network 62 comprises the first contact pair R1B of the first relay and the second contact pair R3B of the second relay in parallel across first and second output leads L1 and L2, respectively. Further, the first contact pair R2A of the second relay is connected across the second output lead L2 and a third output lead L3.

The second contact network 64 comprises the normally closed first contact pair R4A of the fourth relay and the third contact pair R1C of the first relay in parallel across fourth and fifth output leads L4 and L5, respectively.

The overload contact pairs OL1 and OL2 are shown in FIGURE 2 as being respectively adjacent to a first and second overload heaters F1 and F2 in the motor leads P1A and P3A. These are shown as thermal overload breakers in both FIGURES 1 and 2 but it is to be expressly understood that magnetic overload breakers or the like may be readily substituted.

It should also be noted that the control contacts M1 . . . M6 are all gang operated by the starter relay winding M as shown by the phantom linkage 66 in FIGURE 1.

Referring to FIGURE 2, the fifth relay winding R5 is shown as including a shorted turn R5S which provides the said fifth relay with a time delay characteristic for a purpose to be hereinafter more fully described.

Figure 1B:
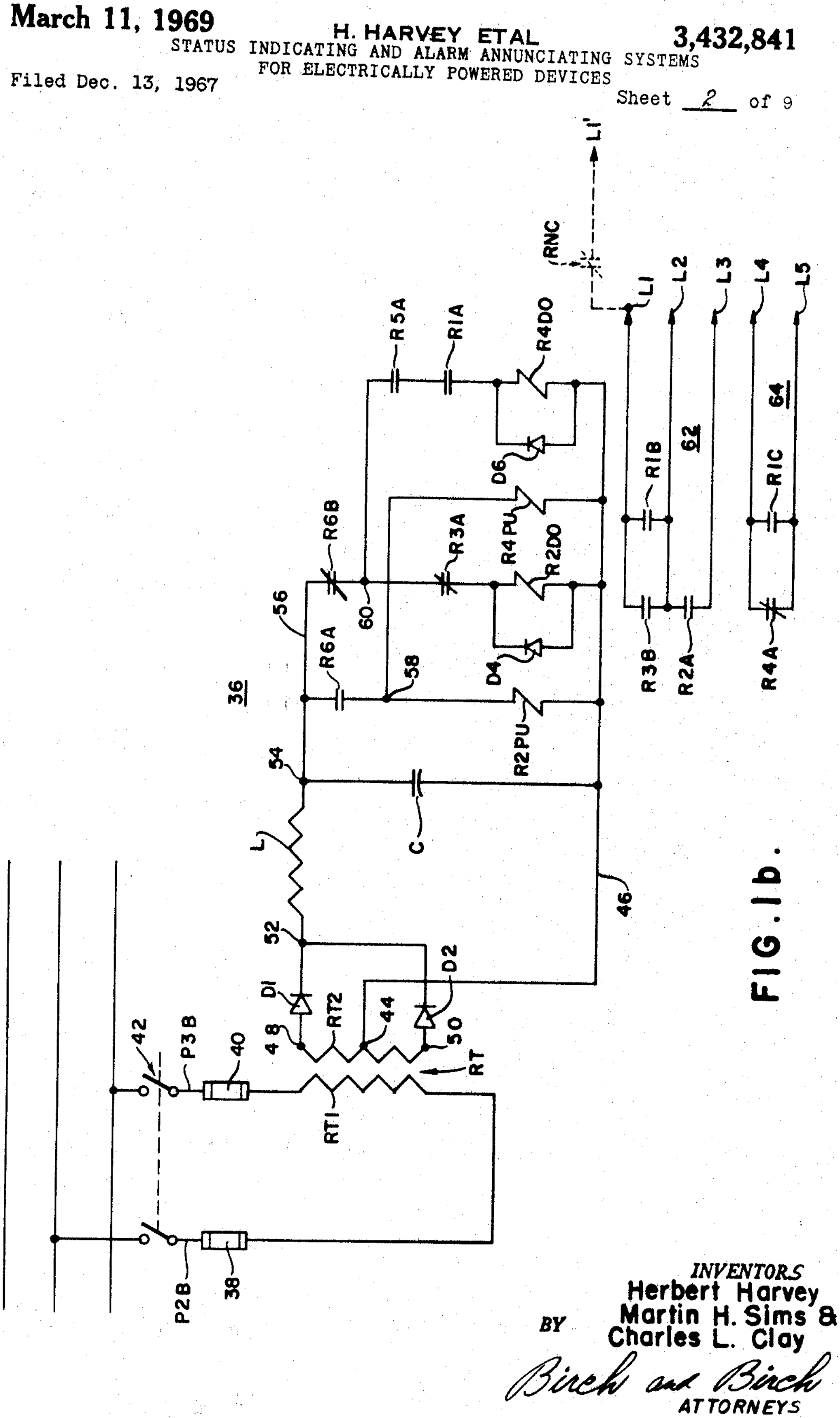
Figure 2A:
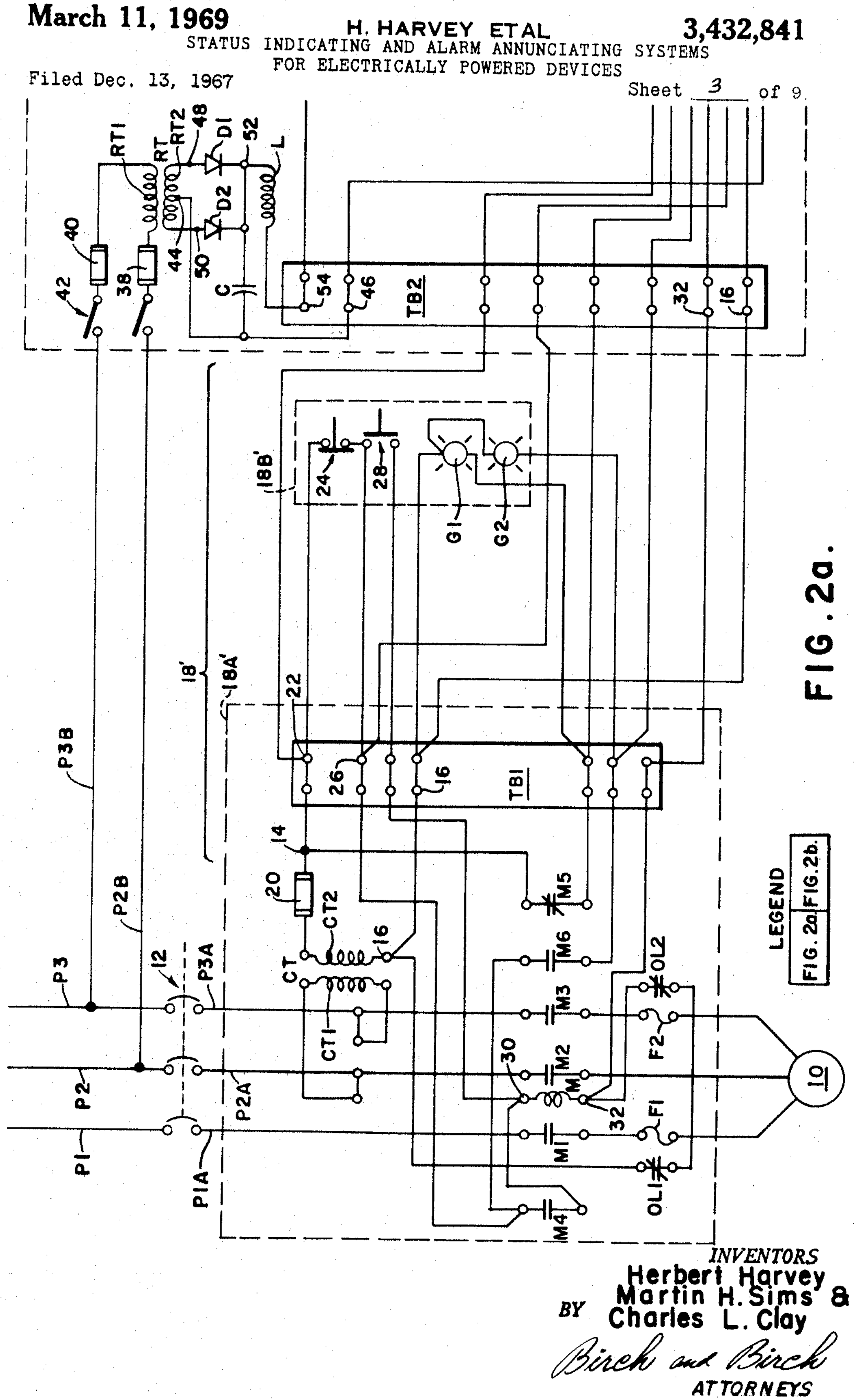
FIGURE 2 is a schematic wiring diagram arranged to show the relative physical locations of the devices shown in FIGURE 1.
Figure 2B:
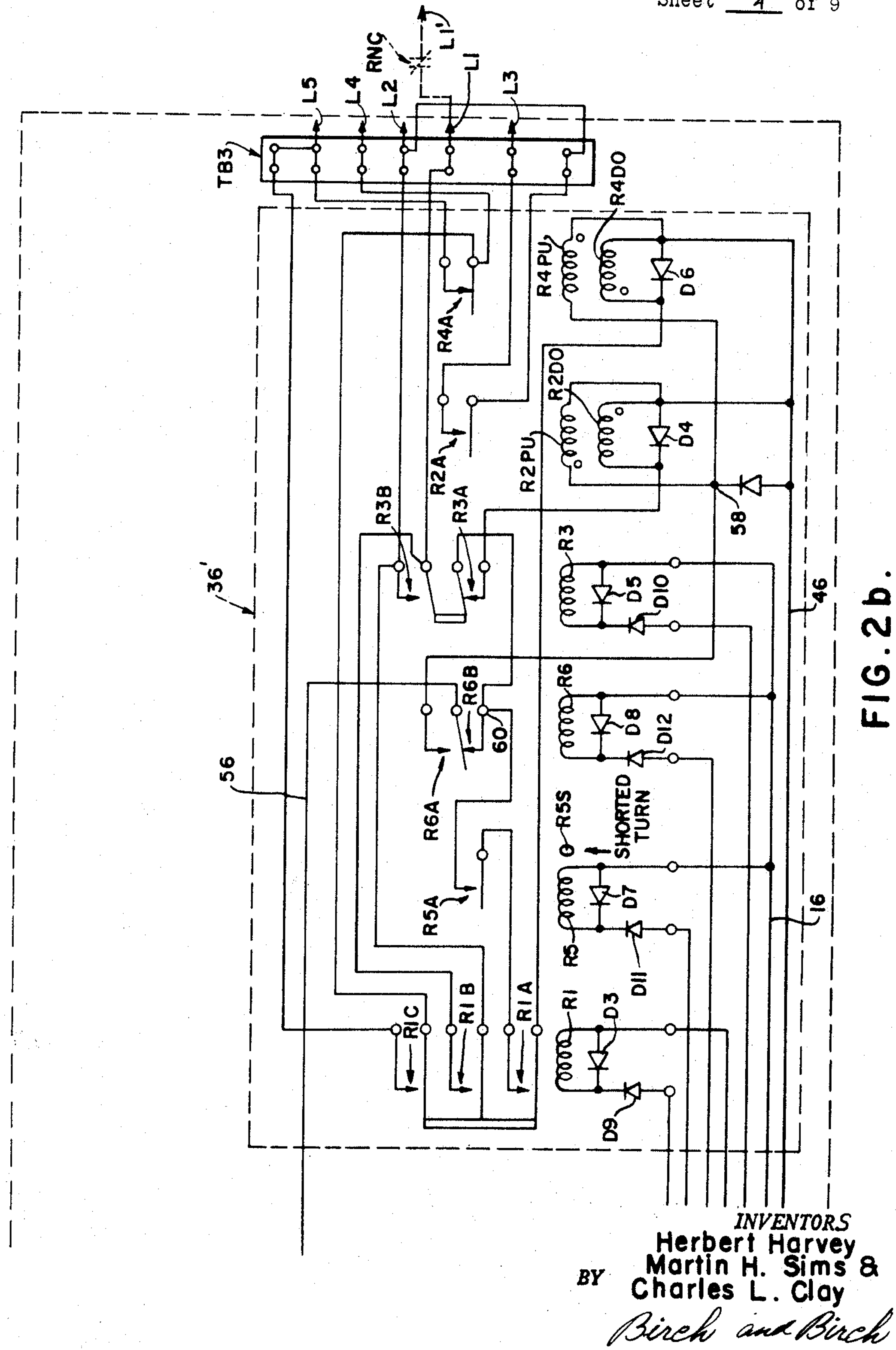

Additional alarm conditions caused by the failure of a motor 10 to perform its intended function can be monitored and transmitted by the contact network 62 by including a normally closed external contact RNC in series with the first output lead L1 and an auxiliary first output lead L1′ as shown in FIGURES 1*b* and 2*b*.

With the external contact RNC adapted to be opened by conditions external to the control and companion circuits 18–36, it is now readily seen that a plurality of such external contacts RNC or plurality of external condition sensors operating on a single external contact RNC will afford a wide range of distinct monitoring functions for the system of the present invention.

It should be clearly understood, at this point of the description, that the circuit of FIGURES 1*a* and 1*b* is only an electrical schematic for the purpose of clearly indicating the functional interrelationships and logic of the elements therein.

In actual practice, referring to FIGURES 2*a* and 2*b* all of the six sensing relays, their associated windings R1 . . . R6 and their respectively associated relay contacts R1A . . . R1C, R2A, R3A and R3B, R4A, R5A and R6A and R6B are contained in a common hermetically sealed module, indicated by the numeral 36′, hereinafter referred to as status module 36′.

The balance of the circuitry is identified as control circuit 18′ with a motor starter section 18A′ and a remote push-button station 18B′.

Thus, the circuits 18′ and 36′ of FIGURES 2*a* and 2*b* are the actual physical embodiments of the combined control circuit 18 and companion circuit 36 described with reference to FIGS. 1*a* and 1*b*. The circuits 18′–36′ embody the same circuit elements as the circuits 18–36 but include the electrical interface connections represented by the terminal boards TB1, TB2 and TB3 with the said circuit elements in a specific physical as well as electrical relationship.

The operational chart of FIGURE 3 will become self-explanatory with reference to the description of operation of the present invention to be hereinafter more fully described.

Figure 4:
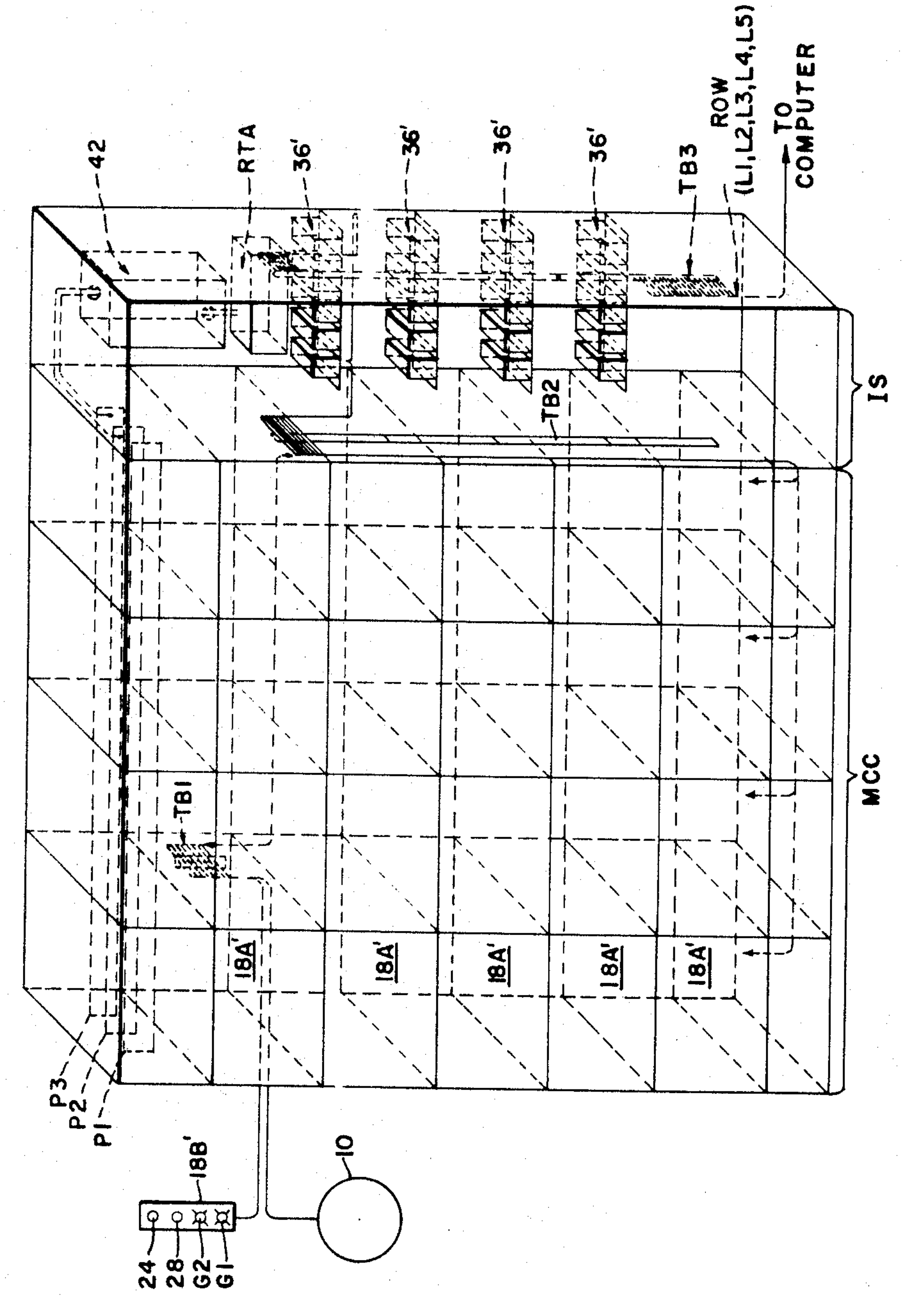
FIGURE 4 is a schematic diagram showing a typical physical installation of the remote located major components illustrating the physical and electrical interface of the present invention.

Referring jointly to FIGURES 2 and 4, the latter of which shows the general physical orientation of a motor 10 with the overall control and readout system of the present invention, each motor 10 has its push-button station 18B′ connected with its associated motor starter section 18A′ through a common first terminal block TB1.

Each status module 36′ is connected with its associated control circuit 18 through a common second terminal block TB2 and with a readout device such as a computer or instrument panel through a common third terminal block TB3. The latter is shown in FIGURE 4 with readout wiring ROW, leading to a computer or the like (not shown).

As specifically shown in FIGURE 4, a motor control center MCC is shown as a three-dimensional stack of motor starter sections 18A′, each such section 18A′ representing a control section for a respectively associated motor 10. The motor control center MCC is associated with an instrument section IS which includes the fused switch 42; a direct-current power supply RTA, corresponding to the rectifier-transformer RT and its associated circuitry of FIGURES 1 and 2; and a plurality of status modules 36′, one for each of the motor starter sections 18A′.

Because of the modular unit structure of the status modules 36′, shown and described with reference to FIGURES 2 and 4, the status modules 36′ are fully operable in all environments and fully isolated one from the other through the electrical interfaces comprising the first and second common terminal blocks TB1 and TB2, thereby obviating the attendant hazards of mixing power control and instrument or readout circuitry.

A further advantage is realized in maintenance, since the interface isolation provides a clear dividing line between the responsibilities of maintenance electricians and instrument technicians. Clear distinction is also inherently available between malfunctions in power control circuitry or instrument circuitry.

*Operation*

The operation of the invention will now be described with joint reference to FIGURES 1, 2, 3 and 4, wherein like parts are identified by like numerals. The chart of FIGURE 3 provides the full correlation between the function of the contact pairs of the relay windings R1 . . . R4 and the response provided thereby effecting logical inputs to a computer or instrument panel.

When the power bus P1–P2–P3 is energized and the fused disconnect switch 42 of the status module 36′ is closed, then electric current will flow through the primary RT1 of the rectifier transformer RT. When current flows through the primary RT1 of the rectifier transformer RT, then voltage will appear across the secondary RT2 of the rectifier transformer RT. This voltage being alternating, the rectifier transformer secondary terminal 48 will be positive relative to the center tap terminal 44 of the rectifier transformer secondary RT2 during every alternate half cycle of alternation. During the other alternate half cycles the rectifier transformer secondary terminal 50 will be positive relative to the center tap 44.

The first and second diodes D1 and D2 thus alternately carry current on alternate half cycles until the charge on capacitor C is such that its voltage equals the voltage available at the peak of each half cycle from the transformer secondary RT2. The capacitor C retains its charge until current is drawn from it to operate pick-up and drop-out coils R2PU, R2DO, R4PU and R4DO, respectively, of the second and fourth relays. When this occurs, the charge lost by capacitor C is replaced by the full-wave rectifier action of the first and second diodes D1 and D2.

While the branch circuit breaker 12 in the control circuit 18 is open no electric power can get to the windings R1, R3, R5 and R6 of the first, third, fifth and sixth relays, whereby all of their respectively associated contacts will be in the normal or de-energized position. Going back to the charged capacitor C, current will flow from the plate adjacent the circuit node 54 through the common lead 56, thence through the normally closed contacts R6B of the sixth relay, thence through the normally closed contacts R3A of the third relay, thence through the drop-out coil R2DO of the second relay to the common lead 46 and opposite plate of the capacitor C.

The second and fourth relays are the "magnetic latching" type. These relays consist of two ferro magnetic "reeds" (strips of steel) inside of a hermetically sealed glass tube. The "reeds" have their ends, inside the "tube" plated with gold or some equivalent metal to yield low contact resistance and long life. The "reeds" are positioned on parallel lines with one end of each hermetically sealed to an end of the tube (one "reed" fastened at each end). Each "reed" projects a little over halfway through the tube (the projection is such that the plated ends only overlap). Around the glass tube are wound two coils of insulated wire. One a pick-up coil (R2PU, R4PU) and one a drop-out coil (R2DO, R4DO). Also parallel to the glass tube, and within the coil windings, is a bar magnet, magnetized with a field parallel to the "reeds." Prior to the flow of any current through either coil the "reeds" are in parallel lines not in contact with each other. The magnetic field from the ends of the bar magnet follows the low reluctance path of the "reeds." This field produces a force across the gap between the "reeds" at the center of the glass tube that tends to bring the "reeds" together and hence close the contact. The magnet strength is selected so as not to provide sufficient attractive force to deform the steel "reeds" and bring them into contact; however, the magnet strength is selected so as to provide sufficient strength to hold the "reeds" together (in contact with each other) once they have been brought together by another means.

For the second relay the contact R2A is shown as a normally open contact. When current flows through the pick-up coil R2PU (the second relay) it sets up a magnetic field that adds to the field set-up by the permanent magnet. These combined fields produce sufficient attractive force between the "reeds" to bring them into contact. When the current stops flowing in the pick-up coil R2PU the "reeds" stay in contact until made to separate by some other means. This is called "magnetic latching" and referred to hereinafter as "latching." When current flows through the drop-out coil R2DO of the second relay (in the proper direction) it sets up a magnetic field in opposition to the field set up by the permanent magnet. This opposition field is sufficient to overcome the attractive force holding the "reeds" in contact and the "reeds" part by virtue of the stress forces set up in the "reeds" by virtue of their being deformed while in contact. The action of the drop-out coil R2DO is thus to "unlatch" the relay. When the current stops flowing in the drop-out coil R2DO the "reeds" remain separated as in the beginning, i.e., the relay contacts R2A are returned to normally open position.

For the fourth relay the contact R4A is shown as a normally closed contact. The operation of the relay is identical to the operation of the second relay but the terminology is different. In this case the pick-up coil R4PU acts to overcome the permanent magnet and "latch" the relay contacts R4A open and the drop-out coil R4DO acts to assist the permanent magnet and "unlatch" the relay contact R4A to a normally closed position.

Going back to the description of circuit operation wherein a current flow was established through the second drop-out coil R2DO the result is to ensure that the normally open contact R2A is open (unlatched relay). At the same time, and prior to the first operation, the normally closed contact R4A will be open, because no unlatching current has passed through the drop-out winding R4DO of the fourth relay. After one operation of the circuit (as will be shown hereinafter) the normally closed contact R4A of the fourth relay will be closed at this point in the sequence. Inasmuch as this is normal after the initial operation, this description will be based on the contact R4A of the fourth relay being closed at this point of the sequence being described.

To summarize the sequence described up to now:

(1) The three phase power bus is energized,
(2) The disconnect switch 42 is closed,
(3) The capacitor C is charged,
(4) Current is flowing in the drop-out coil R2DO of the second relay.

Again referring to the drawings, the electric motor 10 is started by first closing the circuit breaker 12. In this condition voltage is applied to the primary CT1 of the control power transformer CT resulting in voltage across the secondary CT2 of the control power transformer CT, causing current to flow in the common leads or terminals 14 and 16, thereby energizing the first relay winding R1 through the ninth diode D9 and the overload contacts OL1 and OL2. The current thus flowing through the first relay winding R1 causes a magnetic field to be set-up within the magnetic circuit of the first relay to close its normally open contacts R1A, R1B and R1C. The function of the ninth diode D9 is to rectify the alternating current available from the control transformer CT permitting only direct current to flow through the coil R1 of the first relay. This direct current operation is for the purpose of minimizing relay chatter and heat loss from the relay winding R1 which is within a hermetically sealed enclosure. During the half cycle when the ninth diode D9 is not conducting, the magnetic field in the magnetic circuit of the first relay winding R1 is collapsing causing a back electromotive force. This back electromotive force causes a current to flow from relay coil R1 through the third diode D3 in a closed path. Thus, the third diode D3 tends to maintain a more steady flow of current through first relay coil R1 and tends to suppress any voltage rise across the first relay coil R1 that could occur if the energy of the collapsing magnetic field was not dissipated by providing a path for the electric current it generates. The fifth relay winding R5 has diodes D7 and D11, the sixth relay winding R6 has diodes D8 and D12, and the third relay winding R3 has diodes D5 and D10 all of which function in the same manner and for the same reason as the combination of relay winding R1 and diodes D3 and D9. In the subsequent discussion of the sequences involving the third, fifth and sixth relay windings R3, R5 and R6, further detailed description of the function of the related diodes will be omitted.

Further, when voltage appears across the control input terminals 14 and 16, electrical current starts to flow from the node 22 through the normally closed auxiliary fifth contact M5 of the motor starter 18A' thence through the eleventh diode D11, thence through the fifth relay winding R5 to the terminal 16. The current flowing through the fifth relay winding R5 causes a magnetic flux to be set-up within its magnetic circuit. The fifth relay has a time delay feature consisting of the shorted turn R5S in the magnetic circuit thereof. This shorted turn R5S has a current induced in it (while the magnetic flux is being built up in the magnetic circuit) that produces a back magneto motive force. This back magneto motive force results in a net lower magnetic flux in the magnetic circuit. The duration of the delay is primarily determined by the resistance of this shorted turn R5S and by how much magnetic leakage there is between the shorted turn and the magnetic circuit. The resistance dissipates energy that in turn causes reduced current flow in the shorted turn and the flux leakage means that the back magneto motive force will be less than the magneto motive force produced by the fifth relay winding R5. In other words, the build up of flux in the magnetic circuit as the result of current in the winding R5 does occur but is slowed down by the back magneto motive force produced by the shorted turn. It does, however, build up to the same level as it would reach without the turn after a delay determined by the resistance of the shorted turn and the flux leakage. This flux, therefore, eventually causes the normally open contact R5A of the fifth relay to close.

Simultaneously with the energization of the fifth relay winding R5, the green indicating light G1, in shunt therewith, is energized. The current flowing through the green indicating light G1 illuminates it giving local indication that the motor is not running.

Further when voltage appears across the terminals 14 and 16, electric current flows from node 22 through the normally closed "stop" pushbutton 24, which is of the spring-returned type, thence through the junction 26, by the tenth diode D10 and the third relay winding R3 to the terminal 16. The current thus flowing through the third relay winding R3 causes a magnetic field to be set up within the magnetic circuit of the third relay causing its normally open contact R3B to close and its normally closed contact R3A to open.

To summarize:

When the circuit breaker 12 is closed the following occurs:

(1) Relay winding R1 is energized;
(2) Relay winding R5 is energized;
(3) The green light G1 is illuminated;
(4) Relay winding R3 is energized.

The closing of the first and fifth relay contacts R1A and R5A completes the current path from the common lead 56 through the normally closed sixth relay contacts R6B and junction 60 through drop-out winding R4DO, energizing the latter, to the common lead 46. Current flow through the drop-out winding R4DO ensures that the normally closed contact R4A of the fourth relay is closed.

The opening of the normally closed contact R3A of the third relay interrupts current flow in the drop-out winding R2DO. Because the second relay is a latching relay, as described hereinbefore, the cessation of current flow in the drop-out winding R2DO does not change the status of the contact R2A of the second relay (it remains open).

To start the motor the start pushbutton 28 is depressed completing a current path from input terminal 14 to node 22 through stop pushbutton 24 to junction 26, through start pushbutton 28 to junction 30, through the starter relay winding M and the overload contacts OL1 and OL2 to the input terminal 16.

When current flows through the motor starter relay winding M a magnetic field is set up within the magnetic circuit of the motor starter 18A'. This magnetic field operates the gang-connection 66 to close the normally open control contacts M1, M2, M3, M4 and M6 and open the normally closed control contact M5. When the fourth control contact M4 closes, then a path for current flow is established from junction 26 through the starter relay winding M, bypassing the start pushbutton 28. Thus, when the start pushbutton 28 is released (and opens by its spring-return action) current will continue to flow through starter relay winding M keeping the motor starter 18A' energized and keeping control contacts M1, M2, M3, M4 and M6 closed and contact M5 open.

The closing of contacts M1, M2 and M3 energizes the motor 10, it now being connected to its three phase input leads P1A, P2A and P3A. With the motor 10 so energized, it rotates at its proper speed provided it is not overloaded.

The opening of the fifth control contact M5 interrupts the flow of current through the fifth relay winding R5 and through the green light G1. Thus, the fifth relay is de-energized and the green light G1 is extinguished. The green light G1 illuminated indicates a stopped motor and the extinguished green light indicates either no power available or a running motor. The de-energizing of the fifth winding R5 causes its contact R5A to open after a short delay caused by the "shorted-turn" R5S on its magnetic circuit. The opening of this contact R5A would interrupt the current flow in the fourth drop-out R4DO but it may have already been interrupted by the opening of the sixth relay contact R6B which occurs without delay as will be hereinafter described. Because the fourth relay is a latching relay, as described hereinbefore, no change occurs in its normally closed contact R4A (it remains closed).

The closing of the sixth control contact M6 establishes a current path from the junction 26 through the twelfth diode D12, the sixth relay winding R6 and the red indicator lamp G2, to the input terminal 16. The flow of current through the red light G2 illuminates it. The red light G2 illuminated indicates that the motor is running.

The closing of the sixth control contact M6 thus energizes the sixth relay winding R6 and effects closing of its normally open contact R6A and opening of its normally closed contact R6B.

The opening of the normally closed contact R6B interrupts the current flow in the drop-out winding R4DO as hereinbefore stated. The closing of the normally open contact R6A completes a current path from the common lead 56 through the junction 58 and the parallel connected pick-up windings R2PU and R4PU, respectively, to the common lead 46. Current flow through the pick-up windings R2PU and R4PU causes, respectively, closing of the normally open contact R2A and opening of the normally closed contact R4A. Both of these contacts are latched in these new positions as previously described herein.

To summarize, the depressing and subsequent releasing of the spring return "start" pushbutton results in the following:

(1) Motor starter relay winding M is energized and held energized by the M4 contact;
(2) The motor is started by the closing of the M1, M2 and M3 contacts;
(3) The fifth relay coil R5 is de-energized opening its contact R5A;
(4) The green light G1 is extinguished;
(5) The sixth relay coil R6 is energized opening its second contact R6B and closing its first contact R6A;
(6) The relay drop-out coil R4DO is de-energized when second contact R6B of the sixth relay opens (no change in the normally closed contact R4A is effected);
(7) The pick-up coil R2PU of the second relay is energized when the first contact R6A of the sixth relay closes. This causes the first contact R2A of the second relay to close;
(8) The pick-up winding R4PU of the fourth relay is energized when the contact R6A of the sixth relay closes. This causes the contact R4A to open;
(9) The red light G2 is illuminated.

The above situation is a normal condition for the circuit 18'–36' when the motor is running and will hereinafter be referred to as the "running condition."

When the circuit 18'–36' is the "running condition" and the "stop" pushbutton 24 is depressed thereby opening its contact the following occurs:

Current flow is interrupted in the third relay coil R3 thus de-energizing the third relay. When the third relay is de-energized its contact R3A closes and its contact R3B opens. This relay is selected with low inertia components that cause it to act faster than any of the motor starters it may be associated with.

Current flow is interrupted in the starter relay winding M de-energizing the motor starter 18A'. This causes control contacts M1, M2, M3, M4 and M6 to open and control contact M5 to close. The subsequent releasing of the "stop" pushbutton 24 thus permitting its spring return to the closed position thereby closing its contacts will not re-energize the starter relay winding M because neither the path through fourth control contact M4 nor the "start" pushbutton 28 is now available.

The opening of the first, second and third control contacts M1, M2 and M3 interrupts the flow of current to the motor 10 thereby stopping the motor 10.

The opening of the "stop" pushbutton 24 interrupts the current flow to thereby de-energize the sixth relay winding R6 causing its contact R6A to open, its contact R6B to close, and the red light G2 to extinguish. It should be noted that the opening of the sixth control contact M6 also interrupts the current path to the sixth relay winding R6 and mainains this interruption after the "stop" pushbutton 24 is released and its contacts close.

The opening of the sixth relay contact R6A interrupts the current flow in the pick-up winding R2PU (second relay) and pick-up winding R4PU (fourth relay). The interruption of current flow in these windings produces no change in the contacts of R2A and R4A of the respective second and fourth relays because of their latch action as hereinbefore described.

The closing of the sixth relay contact R6B in conjunction with the closure of the third relay contact R3A causes current to flow through the drop-out winding R2DO of the second relay from the common lead 56 to the common lead 46.

It should be noted that this circuit is completed for the normally short time interval starting when the contact R6B closes and ending when the contact R3A opens (the latter occurs when the third relay winding R3 is energized upon the release of the "stop" pushbutton 24 allowing its contacts to close and providing a current path for current through the third relay winding R3). The inertia of the third and sixth relay elements (hence their speed of response) is selected such that it is not possible to depress the "stop" pushbutton 24 long enough to have the fourth control contact M4 open without also having current flow through the second drop-out winding R2DO. Current flow in the said winding R2DO causes the contact R2A to open and latch open as hereinbefore described.

Closing of the fifth control contact M5 establishes current flow through the green light G1 through the same path as hereinbefore described thus illuminating the green light.

Closing of the fifth control contact M5 also establishes current flow in the fifth relay winding R5 (through the path hereinbefore described) thus energizing the fifth relay. After a short delay (caused by the shorted turn as hereinbefore described) the contact R5A closes. This closure provides a current path through contacts R6B (as hereinbefore described) that causes current to flow in the fourth drop-out winding R4DO. This current flow causes the contact R4A to close and latch closed as hereinbefore described.

Releasing the stop button 24 causes current to flow in the third relay winding R3 path, hereinbefore described, which energizes the third relay, opens the contact R3A and closes the contact R3B, but no further action occurs.

To summarize, when the circuit 18'–36' is in the "running condition" and the depressing and subsequent releasing of the spring return "stop" pushbutton results in the following:

(1) Current flow is interrupted through the motor starter relay winding M causing contacts M1, M2, M3, M4 and M6 to open and contact M5 to close;
(2) Current flow is interrupted through the sixth relay winding R6 causing contact R6A to open and contact R6B to close;
(3) Current flow is interrupted through the red light G2, causing it to be extinguished;
(4) Current flow through the third relay coil R3 is interrupted, de-energizing the third relay, thus causing the contact R3A to close and the contact R3B to open (the third relay stays de-energized only for the interval of time that the "stop" pushbutton contacts are held open);
(5) Current flow is established through the fifth relay winding R5 energizing the fifth relay and causing the contact R5A to close after a short time delay;
(6) Current flow is established through the green light G1, causing it to become illuminated;
(7) Current flow is established through the drop-out winding R2DO of the second relay causing contact R2A to open and latch open;
(8) Current flow is established through the drop-out winding R4DO of the fourth relay causing contact R4A to close and latch closed.

The above situation is a normal condition for the circuit 18'–36' when the motor 10 is in a normal stop condition and will hereinafter be referred to as the "normal stopped condition."

When the circuit 18'–36' is in the "running condition" and the motor becomes overloaded, the following occurs:

Excess current will be drawn by the motor 10. This excess current will flow through the overload heater elements F1 and F2. After a length of time, depending upon the magnitude of the overload, either one or both of the overload contacts OL1 and OL2 will open (the reasons both may not open are difference of calibration and balance of current between phases as drawn by the motor). The opening of either or both overload contacts OL1 and/or OL2 will cause the following: The path of current flow through first relay winding R1, as hereinbefore described, will be interrupted thus de-energizing the first relay. The de-energizing of the first relay will cause first relay contacts R1A, R1B and R1C to open.

Also, the opening of either or both overload contacts OL1 and/or OL2 will cause the following: The path of current through the starter relay winding M, as hereinbefore described, will be interrupted thus de-energizing the motor starter 18A'. The de-energizing of the motor starter will cause contacts M1, M2, M3, M4 and M6 to open and contact M5 to close. The opening of contacts M1, M2 and M3 will cause the motor 10 to stop, as hereinbefore described. The opening of the fourth control contact M4 will interrupt a path for current flow through the main control winding M, as hereinbefore described, thus preventing the flow of current through the said starter relay winding M if the overload contacts OL1 and OL2 alone are reclosed (a manual operation, once the overload contacts open they mechanically latch open and require manual reclosure). The opening of the sixth control contact M6 interrupts the path of current flow (hereinbefore described) through the sixth relay winding R6, causing the contact R6A to open and the contact R6B to close. Also, the opening of the control contact M6 will interrupt the current path (hereinbefore described) through the red light G2 thus extinguishing it. The opening of the contact R6A interrupts the current paths (hereinbefore described) through the pick-up windings R2PU and R4PU. Because the second and fourth relays are latch relays (as hereinbefore described) no contact changes will result in the second and fourth relays as the result of this cessation of current flow.

The closing of the fifth control contact M5 will establish a path of current flow (as hereinbefore described) through the green light G1 thus illuminating it. The closing of the control contact M5 will also establish a path of current flow (as hereinbefore described) through the fifth relay winding R5 thus energizing the fifth relay. After a short time delay the contact R5A opens. It should be noted that third relay was not affected in the above sequence so contact R3A remained open thus preventing any path for current through the drop-out winding R2DO of the second relay.

It should also be noted that the contact R1A opened before either the contact R6B or the contact R5A closed, therefore, the drop-out winding R4DO was not affected in the above sequence.

To summarize when the circuit 18′–36′ is in the "running condition" and the motor 10 becomes overloaded, the following occurs:

(1) The overload contacts OL1 and/or OL2 open as the result of heat from the overload heaters F1 and/or F2 which in turn is the result of excessive current through the said overload heaters;
(2) The first relay winding R1 becomes de-energized, thus contacts R1A, R1B and R1C open;
(3) Starter relay winding M becomes de-energized thus control contacts M1, M2, M3, M4 and M6 open and contact M5 closes;
(4) The motor 10 stops as the result of the opening of control contacts M1, M2 and M3;
(5) The starter relay winding M is prevented from reenergizing when the overload contacts OL1 and OL2 alone are reset by virtue of the open control contact M4;
(6) The opening of the control contact M6 extinguishes the red light G2;
(7) The opening of the control contact M6 de-energizes the sixth relay winding R6. Thus the contact R6A opens and the contact R6B closes;
(8) The closing of the control contact M5 illuminates the green light G1;
(9) The closing of the control contact M5 energizes the fifth relay winding R5, thus the contact R5A closes after a short time delay.

The above circuit condition exists when a motor 10 has stopped because of overload and will hereinafter be referred to as an "overload stop condition."

When the circuit 18′–36′ is in the "overload stop condition" and the "stop" pushbutton 24 is depressed, its contacts open and the path for current flow (hereinbefore described) through the third relay winding R3 is interrupted thus de-energizing the third relay and closing contact R3A, thus establishing a path (hereinbefore described) for current flow through the drop-out winding R2DO of the second relay causing the contact R2A to open.

When the circuit 18′–36′ is in the "overload stop condition" and the overload contacts OL1 and OL2 are manually reset, a path (hereinbefore described) for current flow through the first relay winding R1 is established. This current flow energizes the first relay, thus closing the contacts R1A, R1B and R1C. The closing of the contact R1A establishes a path for current flow (hereinbefore described) through the drop-out winding R4DO of the fourth relay thus closing the contact R4A.

When the circuit 18′–36′ is in the "normal stopped condition" and power to the three-phase motor control center bus P1–P2–P3 is interrupted or circuit breaker 12 is opened or the control transformer CT fails or the fuse 20 opens or any wiring connecting these devices becomes open circuited, then the following occurs: Current paths (hereinbefore described) through relay windings R1, R3 and R5 and the green light G1 are interrupted, causing the first, third and fifth relays to become de-energized and the green light G1 to become extinguished, thereby causing contacts R1A, R1B, R1C, R3B and R5A to open and contact R3A to close. The second, fourth and sixth relays and the red light G2 are not affected.

When the circuit 18′–36′ is in the running condition and power to the three-phase motor control center bus P1–P2–P3 is interrupted, or circuit breaker 12 is opened, or the control transformer CT fails or the fuse 20 opens or any wiring connecting these devices becomes open circuited, then the following occurs: Current paths (hereinbefore described) through the relay windings R1, R3 and R6 and the green light G1 are interrupted causing the first, third and sixth relays to become de-energized and the red light G2 to become extinguished, and causing contacts R1A, R1B, R1C, R3B and R6A to open and contacts R3A and R6B to close. The fifth relay and the green light G1 are not affected.

The closing of the contacts R6B and R3A establishes a current path (hereinbefore described) through the dropout winding R2DO of the second relay causing contact R2A to latch in the open position. It should be noted that if the failure was in power to the three-phase motor control center bus P1–P2–P3 the capacitor C is sized to have ample storage of electrical charge to provide the power pulse to unlatch the second relays in all of the circuits fed by the common D.C. power supply RTA (FIG. 4) even though the charging circuit for capacitor C becomes inoperative when power to the three-phase motor control center bus P1–P2–P3 fails. This does not result in an excessively large capacitor because the power requirements of the "reed" relays comprising the said second relays is very small.

It should be noted that if one of the failures described above power to the three-phase motor control center bus P1–P2–P3 is interrupted, or circuit breaker 12 is opened, or the control transformer CT fails or the fuse 20 opens or any wiring connecting these devices becomes open circuited, or motor overload contact opening (OL1 and/or OL2) occurs during the part of the alternating current cycle when the direction of positive current flow is out of the main control winding M toward the junction 30, the inductive effect of winding M and the energy stored in its associated magnetic circuit will tend to maintain such current flow. This current has the opportunity to flow through relay windings R1, R3 and R6 if there is a power failure to the three-phase motor control center bus P1–P2–P3, or circuit breaker 12 is opened or the control transformer CT fails or fuse 20 opens or any wiring connecting these devices becomes open circuited during the interval after any one of the above occurences and before contact M4 opens.

This current has the opportunity to flow only through the first relay winding R1 if motor overload contacts OL1 and/or OL2 open during the interval after the said overload contacts open and before the control contact M4 opens.

As will be seen later, the significance of this current flow has to do with the interval after the sixth relay winding R6 is de-energized and before the first relay winding R1 is de-energized. This interval is approximately the same in the case of overload contacts OL1 and/or OL2 opening (starter relay winding M providing stored energy current flow through the first relay winding R1 only) as compared to the case where stored energy current flow from the starter relay winding M can flow through first, third and sixth relay windings R1, R3 and R6. Any solution that prevents misoperation for the one case will automatically take care of the other case, therefore, the sequence relating to this stored energy current flow from the starter relay winding M through the first, third and sixth relay coils R1, R3 and R6 will be considered covered by what follows. The path for current flow through the first relay winding R1 after the overload contacts OL1 and/or OL2 opens is as follows:

Starting at the starter relay winding M current flows through the junction 30 and through control contact M4, thence through "stop" pushbutton 24, thence through node 22 and terminal 14, thence through ninth diode D9 and first relay winding R1 to the junction 32. This path is not interrupted until control contact M4 opens.

In the case of motor starters built to commercial standards no particular attention is given to slight time differences in actual contact operation, therefore, the sixth control contact M6 can open before the fourth control contact M4. If this happens then the sixth relay winding R6 can become de-energized before the first relay winding R1. When this happens contact R6B will close before the contact R1A opens and a pulse of current sufficient to unlatch the fourth relay could flow through the drop-out winding R4DO of the fourth relay. This would result in an improper sequence and produce a result contrary to the desired logic. To prevent this improper sequence, the normally open contact R5A of the fifth relay winding R5 is placed in series with the relay contact R1A. The contact R5A would not start to close until the fifth control contact M5 drops closed. Again a starter built to commercial tolerances could have a control contact M5 closing before the control contact M4 opens when the motor starter is de-energized. The shorted turn R5S around the magnetic circuit of the fifth relay delays its pickup sufficiently so that the contact R5A cannot close until the contact R1A is open.

In the other case (current flow through the starter relay winding M interrupted by power failure, etc.) the sixth relay could actually drop out before the sixth control circuit M6 opens because the red light G2 in parallel with the sixth relay winding R6 will tend to reduce the voltage across the sixth relay winding R6. The first relay winding R1 has no such light in parallel. If this occurs the interval is longer than previously described and the delay in the fifth relay winding R5 has to be adequate to cover this interval. It should be noted, also, that delay in the first relay will only aggravate this possibility and delay in the sixth relay cannot be introduced or improper circuit action may occur during a normal "stop" operation. It should be further noted that because this circuit is dependent on relay response times the hermetic sealing of the enclosure for relays R1, R2, R3, R4, R5 and R6 is very desirable to prevent the entrance of dirt or other foreign matter that could contaminate the relay bearings, pivot points or other parts of the relays mechanism thereby changing their response times.

Referring to FIGURE 3, the significance of the various sequences and related contact closures described above is presented in chart form.

This chart consists of 22 columns (numbered at the bottom of the columns).

Column 1 shows the contacts feeding data to the computer, R3B, R1B, R2A, R4A and R1C and in special cases an external contact or contacts RNC. Column 1 also shows the status leads to the computer from the "status circuit" 18–36 (a total of 5 consisting of L1, L2, L3, L4 and L5).

Column 2 indicates the points the computer scans. The computer continuously scans these points recording in its memory whether it saw an "open" or a "closed" circuit between these points on its last pass. The computer continuously scans the leads of each motor 10 in the plant remembering for each motor 10 the condition of these points.

Columns 3 and 4 indicate the basic significance of the contact openings and closings.

Columns 5, 6 and 7 show the data to the computer, the decision the computer makes and the instructions the computer gives the typewriter or other readout device for a particular motor 10 when the operator asks the computer for a status report on that particular motor 10 and when that particular motor 10 is "out of service," because no power is available to make it run. The chart refers to this as Case No. 1.

Columns 8, 9 and 10 show the data to the computer, the decision the computer makes and the instructions the computer gives the typewriter or other readout device for a particular motor 10 when the operator asks the computer for a status report on that particular motor 10 and when that particular motor 10 is "ready to run."

The chart refers to this as Case No. 2.

The computer can be programmed to automatically type this information for a particular motor when the condition of the motor changes from Case Nos. 1 and/or 3 to Case No. 2.

Columns 11, 12 and 13 show the data to the computer, the decision the computer makes and the instructions the computer gives the typewriter or other readout device for a particular motor 10 when the operator asks the computer for a status report on that particular motor 10 and when that particular motor 10 is "running."

The chart refers to this as Case No. 3.

The computer can be programmed to automatically type this information for a particular motor 10 when the condition of the motor changes from Case No. 2 to Case No. 3.

Columns 14, 15 and 16 show the data to the computer, the decision the computer makes and the instructions the computer gives the typewriter or other readout device for a particular motor 10 when the operator asks the computer for a status report on that particular motor 10 and when that particular motor 10 is "stopped because of overload."

The chart refers to this as Case No. 4.

The computer can be programmed to automatically type this information for a particular motor 10 when the condition of the motor 10 changes from Case No. 3 to Case No. 4. The computer can also be programmed to sound an audible alarm when the condition of the motor 10 changes from Case No. 3 to Case No. 4.

Columns 17, 18 and 19 show the data to the computer, the decision the computer makes and the instructions the computer gives the typewriter or other readout device for a particular motor 10 when the operator asks the computer for a status report on that particular motor 10 and when that particular motor 10 is "stopped because of power failure."

The chart refers to this as Case No. 5.

The computer can be programmed to automatically type this information for a particular motor 10 when the condition of the motor 10 changes from Case No. 3 to Case No. 5. The computer can also be programmed to sound an audible alarm when the condition of the motor 10 changes from Case No. 3 to Case No. 5.

Columns 20, 21 and 22 show the data to the computer, the decision the computer makes and the instructions the computer gives the typewriter or other readout device for a particular motor 10 when the operator asks the computer for a status report on that particular motor 10 and when that particular motor 10 is running but its intended function is not being achieved because of "equipment failure."

The chart refers to this as Case No. 6.

The computer can be programmed to automatically type this information for a particular motor 10 when the condition of the motor 10 changes from Case No. 3 to Case No. 6. The computer can also be programmed to sound an audible alarm when the condition changes from Case No. 3 to Case No. 6.

It should be noted that the computer can be programmed so that any change in condition from one case to another will cause the computer to instruct the typewriter to type the change and/or sound an audible alarm.

It should further be noted that the computer can be programmed to automatically instruct the typewriter to type out the status of all motors once a day, once a shift or at any desired interval. This gives automatic logging of running time for each motor and gives the maintenance department a continual log of motors out of service. This latter feature easily enables the maintenance supervisor to become aware of those motors that remain out of service an exceptionally long period of time.

The chart indicates five conductors to the computer. These conductors can be part of a multiconductor cable (each conductor 22 AWG because of extremely low currents involved).

The same functions and results can be achieved with four conductors by combining conductor L3 and conductor L4 and bringing a single conductor to the computer in place of these two conductors.

The choice of whether a four wire or five wire system should be used depends upon the computer in the plant and its other uses. If the computer is already programmed (and has facilities) for process and/or other alarms then it is simpler and less expensive to program it with conductors L4 and L5 electrically separate from conductors L1, L2 and L3 because the alarm function from the status system can be combined with other alarms without establishing non-workable cross connections within the computer circuitry. If the computer is selected for use with this status circuitry as well as other circuitry from other process alarms and/or variables then the four conductor status systems can be made to function with very minor differences in computer cost when compared to the five conductor system.

It should be noted that Case No. 6 requires the latter type of computer because here the effective alarm signal appears between conductors L1 and L2 as opposed to L4 and L5.

The "status system" circuit is in itself a computer because it has both a program and a memory.

Referring to column 1 of the chart, the basic information from the readout crcuit 62 between the readout leads L1 and L2 is "Motor Ready to Run" (circuit closed) or "Motor Not Ready to Run" (circuit open) derived from the contacts R1B and R3B in parallel. When the external contact RNC is used in the output lead L1 it changes the basic meaning but when the external contact opens in this circuit and this circuit is compared to closed circuits between conductors L2 and L3 and between conductors L4 and L5 it provides a unique combination of open and closed circuits that prevails only if the motor is running but not acheving its intended function.

Going back to the parallel combination of contacts R1B and R3B the primary information comes from the contact R1B alone (closed-motor ready to run) (open-motor not ready to run). In Case No. 4, however, the contacts R1B is open, but the motor 10 is actually ready to run (if started it would be overloaded) and to preserve the proper indication from the conductors L1–L2, the contact R3B is placed in parallel with the contact R1B to show a closed circuit. In all other cases the contacts R1B and R3B are either both open or both closed.

Referring again to column 1 of the chart, the basic information from the readout circuit 62 between the readout leads L2 and L3 is "Motor Asked to Run" (circuit closed) and "Motor Not Asked to Run" (circuit open). This is achieved by the contact R2A of the second relay (latching type) that is latched closed when the "start" pushbutton 28 is depressed and is only unlatched when the "stop" pushbutton 24 is depressed.

Referring again to column 1 of the chart, the readout circuit 64 between conductors L4 and L5 is wired with contact R4A in parallel with contact R1C. The basic information from this circuit is "Alarm Condition" (circuit open) and "No Alarm Condition" (circuit closed). Relay contact R4A is latched open when the motor 10 is started and is unlatched when the motor 10 stops (provided there is still power available in the power control circuit and provided the overload contacts are closed). The contact R1C is wired in parallel to prevent an alarm report for Case No. 3 (running).

FIGURE 4 illustrates a typical physical installation of the "status system." FIGURE 4 shows a typical motor control center MCC with an instrument section IS attached for the containment of the "status system" circuitry. This section complete with "status system" mounting brackets, D.C. power supply complete and connected to power bus, terminal blocks, wiring from each starter cubicle to the power and control wiring terminal blocks and wiring from the D.C. power supply to the instrument terminal blocks. In the event of code requirements barriers can be placed so as to isolate the power and control terminal blocks from the remainder of the instrument section IS. This instrument section IS, complete as described above, is easily obtainable from a motor control center manufacturer and adds but a small percentage to the cost of the motor control center MCC because the work can be done on an assembly line basis as opposed to "field fabrication and installation."

By getting such an equipped instrument section IS and also running a single multi-conductor cable ROW from such a section to the computer (with enough conductors for each motor 10 in the motor control center MCC) then status modules 36′ can be added or deleted by merely mounting and wiring or removing and disconnecting the hermetically sealed units comprising the status modules 36′ in the instrument section and making appropriate changes to the computer program.

As can be seen from the foregoing specification and drawings, the present invention satisfies a long-felt need in the art for a comprehensible, readily maintainable and versatile motor status indicating system which is readily adaptable to a wide range of magnitude of multiple motor monitoring and alarm annunciating applications.

Without further description, it is believed that the advantages of the present invention over the prior art is apparent and while only one preferred embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. For use in a status monitoring system for an electrically powered device circuit means effecting control and readout of status conditions of such a device by preselected combinations of open and closed contact pairs, said circuit means comprising:

control means for an electrically powered device including a control winding and a preselected plurality of control contact pairs controlled thereby, said contact pairs being adapted to selectively energize the device from a first source of electrical power by an electrically powered start and stop switch means adapted to connect said control winding across said first source of power and respectively control the energization and de-energization of said control winding and the device;

a plurality of sensing relays comprising a respectively associated plurality of relay windings each with a predetermined number of associated relay contact pairs, certain ones of said relay contact pairs being adapted to operate across a second power source, certain ones of said relay windings being adapted to be connected across said first power source and certain other of said relay windings being adapted to be connected across said second power source, said relay windings having a first predetermined portion of their number controlled by said control contact pairs and a second predetermined portion of their number controlled by said certain ones of said relay contact pairs;

a first common electrical interface between the electrically powered device control means and said plurality of sensing relays; and a second common electrical interface comprising an information output for said sensing relays, said second interface including a plurality of output terminals adapted to be connected with a plurality of output leads, said terminals and the said leads adapted to be selectively shunted by certain other of said relay contact pairs to effect transmission over the said leads of information defining the operating status of a said electrically powered device.

2. The invention defined in claim 1, wherein of said plurality of sensing relay windings, at least one is directly controlled by said stop switch means.

3. The invention defined in claim 1, wherein said circuit further comprises overload responsive means selectively de-energizing said control winding and at least one of said sensing relay windings in response to an overload condition of a said electrically powered device.

4. The invention defined in claim 1, wherein said circuit further comprises overload responsive means selectively de-energizing said control winding and at least one of said sensing relay windings in response to an overload condition of a said electrically powered device, and wherein of said plurality of sensing relay windings, at least one is directly controlled by said stop switch means.

5. The invention defined in claim 1, wherein said circuit further includes visual indicator means selectively indicating actuated and non-actuated status conditions of a said electrically powered device.

6. The invention defined in claim 1 wherein said circuit further includes visual indicator means selectively indicating actuated and non-actuated status conditions of a said electrically powered device; and wherein said visual indicator means are selectively energized and deenergized by respectively selected ones of said control contact pairs.

7. The invention defined in claim 1, wherein at least one of said sensing relays is provided with a delayed response characteristic.

8. The invention defined in claim 1, wherein said circuit further comprises overload responsive means selectively deenergizing said control winding and at least one of said sensing relay windings in response to an overload condition of a said electrically powered device; wherein of said plurality of sensing relay windings, at least one is directly controlled by said stop switch means, and wherein at least one of said sensing relays is provided with a delayed response characteristic.

9. The invention defined in claim 1, wherein said circuit further comprises overload responsive means selectively de-energizing said control winding and at least one of said sensing relay windings in response to an overload condition of a said electrically powered device; wherein of said plurality of sensing relay windings, at least one is directly controlled by said stop switch means; and wherein at least one of said sensing relays is provided with a delayed response characteristic; and further wherein said circuit further includes visual indicator means selectively indicating actuated and non-actuated status conditions of a said electrically powered device.

10. The invention defined in claim 9, wherein said visual indicator means are selectively energized and deenergized by respectively selected ones of said control contact pairs.

11. The invention defined in claim 1, wherein at least two of said sensing relays are of the multiple-winding, latching type.

12. The invention defined in claim 1, wherein said circuit further comprises overload responsive means selectively de-energizing said control winding and at least one of said sensing relay windings in response to an overload condition of a said electrically powered device; wherein of said plurality of sensing relay windings, at least one is directly controlled by said stop switch means; wherein at least one of said sensing relays is provided with a delayed response characteristic; and wherein at least two of said sensing relays are of the multiple-winding, latching type.

13. The invention defined in claim 1, wherein said circuit further comprises overload responsive means selectively de-energizing said control winding and at least one of said sensing relay windings in response to an overload condition of a said electrically powered device; wherein of said plurality of sensing relay windings, at least one is directly controlled by said stop switch means; wherein at least one of said sensing relays is provided with a delayed response characteristic; wherein at least two of said sensing relays are of the multiple-winding and latching type; wherein said circuit further includes visual indicator means selectively indicating actuated and non-actuated status conditions of said electrically powered device.

14. The invention defined in claim 13, wherein said visual indicator means are selectively energized and deenergized by respectively selected ones of said control contact pairs.

15. The invention defined in claim 1, wherein at least one of said sensing relays, in combination with at least one of said control contacts, is adapted to be energized in response to a non-actuated condition of said electrically powered device.

16. The invention defined in claim 1, wherein at least one of said sensing relays, in combination with at least one of said control contacts, is adapted to be energized in response to an actuated condition of said electrically powered device.

17. The invention defined in claim 1, wherein at least one of said sensing relays is adapted to be energized in direct response to availability of power from said first power source.

18. The invention defined in claim 1, wherein at least two of said sensing relays are of the multiple-winding, latching type; and wherein the said latching type relays, in combination with sensing relay contact pairs other than their own, are comparably energized in response to energization of said start and stop switch means, and adapted to be selectively energized in response to failure of said first power source and overload of a said electrically powered device.

19. The invention defined in claim 1, wherein at least one of said sensing relays, in combination with at least one of said control contacts, is adapted to be energized in response to a non-actuated condition of a said electrically powered device; wherein at least one of said sensing relays, in combination with at least one of said control contacts, is adapted to be energized in response to an actuated condition of a said electrically powered device; wherein at least one of said sensing relays is adapted to be energized in direct response to availability of power from said first power source; and wherein at least two of said sensing relays are of the multiple-winding, latching type; and wherein the said latching type relays, in combination with sensing relay contact pairs other than their own, are comparably energized in response to energization of said start and stop switch means, and adapted to be selectively energized in response to failure of said first power source and overload of said electrically powered device.

20. The invention defined in claim 1, wherein said output terminals from said second common interface comprise first, second and third related pairs of output terminals across each of which preselected combinations of said sensing relay contact pairs are connected, each said pair of output terminals providing information transmittal consisting of a circuit open condition and circuit closed condition between the terminals of each said pair, said circuit conditions in permutation and combination providing status information of a said electrically powered device.

21. The invention defined in claim 20, wherein additional normally closed contact pair means, adapted to be opened in response to conditions external to said circuit and a said electrically powered device, are placed in series with at least one of said output terminals in at least one of said first, second and third output terminal pairs.

22. The invention defined in claim 21, wherein, as between the first, second and third output terminal pairs, respectively, the combination of open, closed and closed circuit conditions provides status information of a said device actuated but equipment controlled by a said device has failed.

23. The invention defined in claim 20, wherein, as between the first, second and third output terminal pairs, an open circuit condition indicates a said device not ready to be actuated, a said device not asked to be actuated, and alarm, respectively, and a closed circuit condition indicates a said device ready to be actuated, a said device asked to be actuated, and no alarm, respectively.

24. The invention defined in claim 23, wherein, as between the first, second and third output terminal pairs, respectively, the combination of open, open and closed circuit conditions provides status information of a said device not ready to be actuated.

25. The invention defined in claim 23, wherein, as between the first, second and third output terminal pairs, respectively, the combination of closed, open and closed circuit conditions provide status information of a said device ready to be actuated.

26. The invention defined in claim 23, wherein as between the first, second and third output terminal pairs, respectively, the combination of closed, closed and closed circuit conditions provides status information of a said device actuated.

27. The invention defined in claim 23, wherein as between the first, second and third output terminal pairs, respectively, the combination of closed, closed and open circuit conditions provides status information of a said device not actuated because of overload.

28. The invention defined in claim 23, wherein as between the first, second and third output terminal pairs, respectively, the combination of open, open and open circuit conditions provides status information of a said device not actuated because of power failure.

29. For use in status monitoring systems for electric motors and the like, circuit means effecting motor control and readout of motor status conditions by preselected combinations of open and closed contact pairs comprising:

a first source of electric power;

electric motor means;

a motor starter relay comprising a control winding and a preselected plurality of control contact pairs controlled thereby;

start and stop switch means connecting said control winding across said first source and respectively controlling the energization and deenergization of said control winding and said electric motor means;

a plurality of sensing relays comprising a respectively associated plurality of relay windings each with a predetermined number of associated relay contact pairs, certain ones of said relay contact pairs being operable across power source means other than said first source, certain ones of said relay windings being connected across said first power source and certain other of said relay windings being connected across other power source means, said relay windings having a first predetermined portion of their number controlled by said control contact pairs and a second predetermined portion of their number controlled by said certain ones of said relay contact pairs;

a first common electrical interface between said motor starter relay and said plurality of sensing relays; and a second common electrical interface comprising an information output terminal for said sensing relays, said second interface including a plurality of output leads adapted to be selectively shunted by certain other of said relay contact pairs to effect transmission thereover of information defining the operating status of said electric motor means controlled by said motor starter relay.

30. The invention defined in claim 29, wherein said output leads from said second common interface comprise first, second and third related pairs of output leads across each of which preselected combinations of said sensing relay contact pairs are connected, each said pair of output leads providing information transmittal consisting of a circuit open condition and circuit closed condition between the leads of each said pair, said circuit conditions in permutation and combination providing status information of said electric motor means.

31. The invention defined in claim 30, wherein additional normally closed contact pair means, adapted to be opened in response to conditions external to said circuit and said electric motor means, are placed in series with at least one of said output leads in at least one of said first, second and third output lead pairs.

32. The invention defined in claim 31, wherein, as between the first, second and third output lead pairs, respectively, the combination of open, closed and closed circuit conditions provides status information of motor running but driven equipment has failed.

33. The invention defined in claim 30, wherein, as between the first, second and third output lead pairs, an open circuit condition indicates motor not ready to run, motor not asked to run, and alarm, respectively, and a closed circuit condition indicates motor ready to run, motor asked to run, and no alarm, respectively.

34. The invention defined in claim 33, wherein, as between the first, second and third output lead pairs, respectively, the combination of open, open and closed circuit conditions provides status information of motor not ready to run.

35. The invention defined in claim 33, wherein, as between the first, second and third output lead pairs, respectively, the combination of closed, open and closed circuit conditions provide status information of motor ready to run.

36. The invention defined in claim 33, wherein as between the first, second and third output lead pairs, respectively, the combination of closed, closed and closed circuit conditions provides status information of motor running.

37. The invention defined in claim 33, wherein as between the first, second and third output lead pairs, respectively, the combination of closed, closed and open circuit conditions provides status information of motor stopped because of overload.

38. The invention defined in claim 33, wherein as between the first, second and third output lead pairs, respectively, the combination of open, open and open circuit conditions provides status information of motor stopped because of power failure.

39. A motor control and status monitoring system comprising:

at least one electric motor means;

a first power source for said motor means;

control means for said electric motor means including a starter relay having a control winding and a preselected plurality of control contact pairs controlled thereby, preselected ones of said control contact pairs selectively connecting said motor means with said first power source;

switch means selectively connecting said control winding across said first power source to effect selective energization thereof;

a plurality of sensing relays comprising a respectively associated plurality of relay windings each with a predetermined number of associated relay contact pairs, certain ones of said relay contact pairs being operable across a second power source, certain ones of said relay windings being connected across said first power source and certain other of said relay windings being connected across said second power source, said relay windings having a first predetermined portion of their number controlled by said control contact pairs and a second predetermined portion of their number controlled by said certain ones of said relay contact pairs;

a first common electrical interface between said control means and said plurality of sensing relays;

a second common electrical interface comprising an information output for said sensing relays, between said sensing relays and said computer means;

said second interface including a plurality of output terminal pairs selectively shunted by certain other of said relay contact pairs; and a plurality of output lead pairs, corresponding to said output terminal pairs, interconnecting said output terminal pairs to said input means of said computer means;

said computer being programmed to provide predetermined motor status information through the said readout means thereof in response to particular combinations of open and closed circuit conditions between said plurality of output terminal pairs.

References Cited

UNITED STATES PATENTS

| | | | |
|---|---|---|---|
| 2,752,588 | 6/1956 | Marmorstone | 340—24.8 |
| 2,956,226 | 10/1960 | Vogt et al. | 340—213 X |
| 3,039,086 | 6/1962 | Inc et al. | 340—253 X |

U.S. Cl. X.R.

EUGENE G. BOTZ, *Primary Examiner.*

235—151.3; 317—13.31; 340—146.1